(12) United States Patent
Yamada (10) Patent No.: US 10,002,304 B2
(45) Date of Patent: Jun. 19, 2018

(54) IMAGE PROCESSING DEVICE THAT READS IMAGE OF ORIGINAL WHILE EMITTING LIGHT TOWARD ORIGINAL

(71) Applicant: BROTHER KOGYO KABUSHIKI KAISHA, Nagoya-shi, Aichi-ken (JP)

(72) Inventor: Takatsugu Yamada, Nagoya (JP)

(73) Assignee: BROTHER KOGYO KABUSHIKI KAISHA, Nagoya-Shi, Aichi-Ken (JP)

(*) Notice: Subject to any disclaimer, the term of this patent is extended or adjusted under 35 U.S.C. 154(b) by 0 days. days.

(21) Appl. No.: 15/414,049

(22) Filed: Jan. 24, 2017

(65) Prior Publication Data
US 2017/0220884 A1 Aug. 3, 2017

(30) Foreign Application Priority Data
Jan. 28, 2016 (JP) ................................ 2016-014287

(51) Int. Cl.
*H04N 1/04* (2006.01)
*G06K 9/20* (2006.01)
*H04N 1/028* (2006.01)
*G06K 9/00* (2006.01)

(52) U.S. Cl.
CPC ....... *G06K 9/2027* (2013.01); *G06K 9/00456* (2013.01); *H04N 1/02845* (2013.01); *H04N 2201/0081* (2013.01); *H04N 2201/0094* (2013.01)

(58) Field of Classification Search
CPC ....... H04N 1/02845; H04N 2201/0094; H04N 2201/0081; G06K 9/2027

USPC .......................................................... 358/518
See application file for complete search history.

(56) References Cited

U.S. PATENT DOCUMENTS

| 8,844,819 B2* | 9/2014 | Mukawa ................ G03B 27/54 235/454 |
| 2010/0157395 A1* | 6/2010 | Ikeda ................. H04N 1/00795 358/505 |

FOREIGN PATENT DOCUMENTS

| JP | 9-197927 A | 7/1997 | |
| JP | 2005-184390 | * 7/2005 | ............... H04N 1/04 |
| JP | 2009-100102 A | 5/2009 | |

* cited by examiner

*Primary Examiner* — Houshang Safaipour
(74) *Attorney, Agent, or Firm* — Merchant & Gould P.C.

(57) ABSTRACT

An image processing device is configured to perform: reading an image of an original while a light emitting portion emits light with a first lighting color to acquire first image data representing the image; storing the first image data in a memory; executing a recognition process for recognizing an ID photograph in the image represented by the first image data; in response to determining that the ID photograph is recognized, outputting the image represented by the first image data; in response to determining that the ID photograph is not recognized, switching a lighting color of the light emitting portion from the first lighting color to a second lighting color different from the first lighting color; and reading the image of the original while the light emitting portion emits light with the second lighting color to acquire second image data representing the image.

12 Claims, 6 Drawing Sheets

IMAGE PROCESSING DEVICE THAT READS IMAGE OF ORIGINAL WHILE EMITTING LIGHT TOWARD ORIGINAL

CROSS REFERENCE TO RELATED APPLICATION

This application claims priority from Japanese Patent Application No. 2016-014287 filed on Jan. 28, 2016. The entire content of the priority application is incorporated herein by reference.

TECHNICAL FIELD

The present disclosure relates to an image processing device.

BACKGROUND

An image forming apparatus is known which has a function to output images of a front side and a back side of a driving license onto one sheet. When such an image forming apparatus is used to make a copy of a driving license, images of the both sides of the driving license are read by an image scanner, and recorded (or printed) on a recording medium.

SUMMARY

The front side of the driving license described above has an area in which a photograph of a driver's face is placed (hereinafter referred to as a face photo area). Not only the driving license but also a variety of cards such as various identification (ID) cards and business cards has an ID photo area such as the face photo area. When the image scanner described above reads images of these cards, facial characteristics can be difficult to be discriminated from the output image due to a color tone, a shade level or density of the face photo area. For example, depending on a skin color of a subject person or a color tone of light used in a photo shoot, a dark color portion of the face photo area can be blocked up, and a light color portion of the same can be blown out.

As a countermeasure to such problems, for example, setting of brightness, a shade level, and density of an output image that is to be recorded on a recording medium can be adjusted to make the blocked-up dark color portion lighter and the blown-out light color portion darker. However, such an adjustment is performed to the output image, and thus is not a technology to optimize an input image inputted by the image scanner. Therefore, in the case that the facial characteristics has been already difficult to be discriminated from the input image at the time when the input image is inputted by the image scanner, the restoration of the blocked-up portion and the blown-out portion is difficult, even with the adjustment of the brightness, the shade level, and the density of the output image.

In view of the foregoing, it is an object of the disclosure to provide an image processing device capable of reading an image from which facial characteristics is easily discriminated when reading the image of an original having a face photo area.

In order to attain the above and other objects, the present disclosure provides an image processing device that includes a reader; a processor; and a memory. The reader includes: a light emitting portion; and a light receiving portion. The light emitting portion is configured to emit light toward an original forming an image. The light receiving portion is configured to receive light reflected from the original. The memory stores a set of computer-readable instructions therein. The set of computer-readable instructions, when executed by the processor, causes the image processing device to perform: reading the image of the original while the light emitting portion emits light with a first lighting color to acquire first image data representing the image; storing the first image data in the memory; executing a first recognition process on the first image data, the first recognition process being executed for recognizing an ID photograph in the image represented by the first image data; determining whether the ID photograph is recognized in the first recognition process; either outputting the image represented by the first image data in response to determining that the ID photograph is recognized in the first recognition process, or switching lighting color of the light emitting portion from the first lighting color to a second lighting color different from the first lighting color and reading the image of the original while the light emitting portion emits light with the second lighting color to acquire second image data representing the image in response to determining that the ID photograph is not recognized in the first recognition process.

According to another aspect, the present disclosure provides a non-transitory computer readable storage medium that stores a set of program instructions for an image processing device. The image processing device includes: a reader; a processor; and a memory. The reader includes: a light emitting portion; and a light receiving portion. The light emitting portion is configured to emit light toward an original forming an image. The light receiving portion is configured to receive light reflected from the original. The set of program instructions, when executed by the processor, causes the image processing device to perform: reading the image of the original while the light emitting portion emits light with a first lighting color to acquire first image data representing the image; storing the first image data in the memory; executing a first recognition process on the first image data, the first recognition process being executed for recognizing an ID photograph in the image represented by the first image data; determining whether the ID photograph is recognized in the first recognition process; either outputting the image represented by the first image data in response to determining that the ID photograph is recognized, or switching a lighting color of the light emitting portion from the first lighting color to a second lighting color different from the first lighting color and reading the image of the original while the light emitting portion emits light with the second lighting color to acquire second image data representing the image in response to determining that the ID photograph is not recognized.

BRIEF DESCRIPTION OF THE DRAWINGS

The particular features and advantages of the disclosure as well as other objects will become apparent from the following description taken in connection with the accompanying drawings, in which.

DETAILED DESCRIPTION

An image processing device according to embodiments will be described while referring to the accompanying drawings.

[Configuration of Image Processing Device]

Figure 1A:
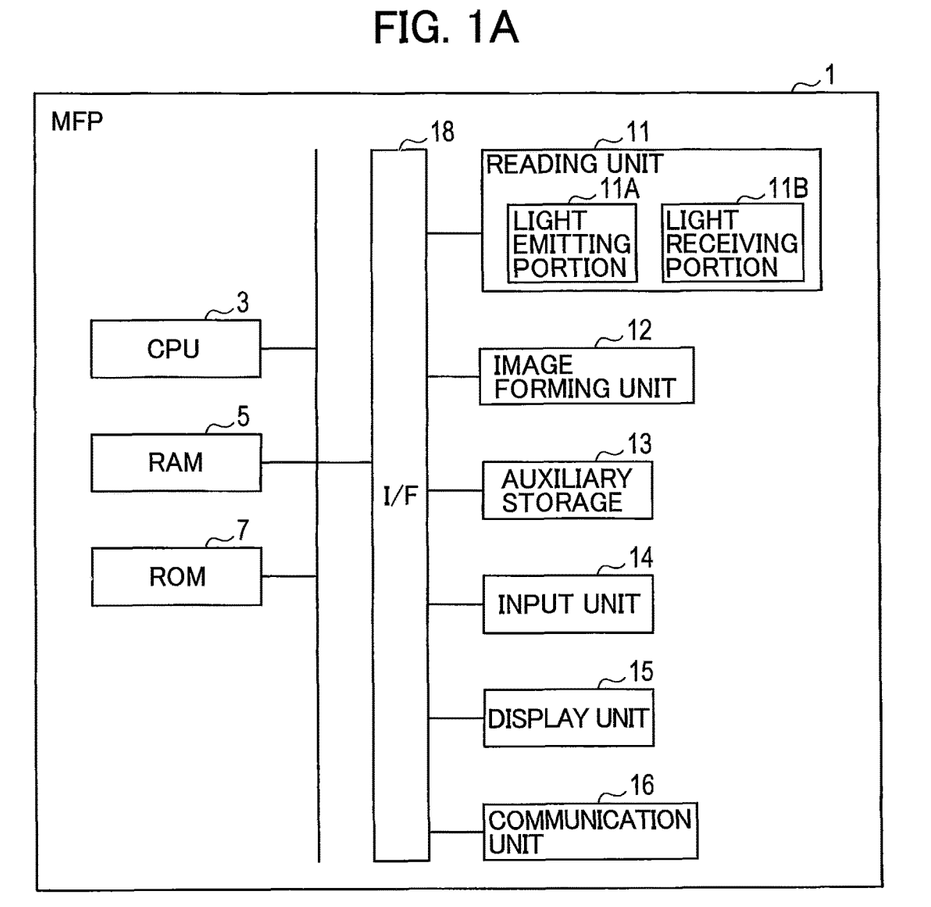
FIG. 1A is a block diagram showing a schematic configuration of a multifunction peripheral (MFP) according to an embodiment.

As illustrated in FIG. 1A, a multifunction peripheral (MFP) 1 (an example of an image processing device in the present disclosure) includes a central processing unit (CPU) 3 (an example of a processor in the present disclosure), a random access memory (RAM) 5 (an example of a memory in the present disclosure), and a read-only memory (ROM) 7. The MFP 1 also includes a reading unit 11, an image forming unit 12 (an example of a reader in the present disclosure), an auxiliary storage 13, an input unit 14 (an example of an operation interface in the present disclosure), a display unit 15 (an example of a display in the present disclosure), and a communication unit 16. These components are connected to the CPU 3 via an interface unit 18.

The CPU 3 executes a variety of processes according to programs stored in the RAM 5 and the ROM 7, and thus controls respective units of the MFP 1, such as the reading unit 11, the image forming unit 12, the auxiliary storage 13, the input unit 14, the display unit 15, and the communication unit 16. The RAM 5 can store a variety of data including the programs described above. In the following description, the MFP 1 performs a variety of processes. However, these processes are achieved by executing corresponding programs stored in the RAM 5 and ROM 7 by the CPU 3 in the MFP 1.

In the present embodiment, the reading unit 11 is configured of a contact image sensor (CIS). The reading unit 11 has a light emitting portion 11A and a light receiving portion 11B. The light emitting portion 11A includes a plurality of light emitting diodes (LEDs). In the present embodiment, the LEDs are classified into three groups on a color basis, that is, red (R), green (G), and blue (B). Each of the LEDs can emit corresponding one of three colors of light with red color, green color, and blue color. The light receiving portion 11B includes a CMOS image sensor, where CMOS stands for a complementary metal-oxide-semiconductor field-effect transistor.

In the reading unit 11, the light emitting portion 11A emits light toward an object to be read while switching between the three colors of light. The lighting color of the light emitting portion 11A is switched by changing light-emission rates of RGB three colors in accordance with lighting color information (described later). In the reading unit 11, the light receiving portion 11B receives light reflected from the object. With this configuration, the reading unit 11 optically reads an image of the object and outputs image data representing the read image. The image data outputted from the reading unit 11 is stored in the RAM 5, and is used for subsequent processes including an output process.

The image forming unit 12 is configured to be capable of forming an image on a recording medium with an electrophotographic method or an inkjet method. The auxiliary storage 13 is configured of a storage, such as a flash memory, a hard disc device, and the like, having a capacity larger than that of the RAM 5. The input unit 14 is configured of a touch panel and the like. A user operates the input unit 14 to provide a variety of instructions to the MFP 1. The display unit 15 is configured of a liquid crystal display and the like, and displays a variety of information provided by the MFP 1 to a user. In the case where the touch panel is included in the input unit 14, the touch panel is superimposed on the display unit 15, and images (for example, images of switches and buttons) showing positions on which touch panel operation is performed are displayed on the display unit 15. The communication unit 16 is configured of a communication device used in a wireless LAN and a communication device used in a wired LAN.

[ID Copy Function]

Figure 1B:
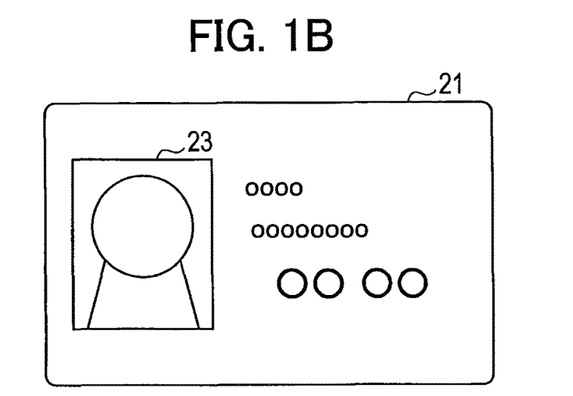
FIG. 1B is an explanatory diagram showing an example of an original having a face photo area.

Next, an ID copy function will be described. The MFP 1 implements functions including the ID copy function. The ID copy function is a function to read an image of an original having an ID photo area in which an ID photograph is placed, and to print out the image (hereinafter also referred to as "print output") or to output the image as a file (hereinafter also referred to as "file output"). For example, an ID card 21 illustrated in FIG. 1B has a face photo area 23 as an example of the ID photo area. The face photo area 23 is an area in which a photograph of a human face is placed. The photograph of the human face is an example of an ID photograph of the present disclosure. A card such as the ID card 21 is an object to be read with the ID copy function. Specifically, the ID card 21 is, for example, a driving license, a passport, a business card with a photograph of a human face, an identification having a face photo area, and the like. However, even images of objects other than those examples can be read and outputted with the ID copy function.

When the ID copy function is used, for example, a user performs an input operation on the input unit 14 to use the ID copy function. Upon receipt of the input operation, the MFP 1 switches an operation mode thereof to the ID copy mode (i.e. operation mode to read an image of an original having a face photo area described in the present disclosure). Hereinafter, an ID copy process will be described with reference to FIG. 2. The ID copy process is performed by the MFP 1 (more specifically, CPU 3, as described above) when the operation mode of the MFP 1 is switched to the ID copy mode.

Figure 2:
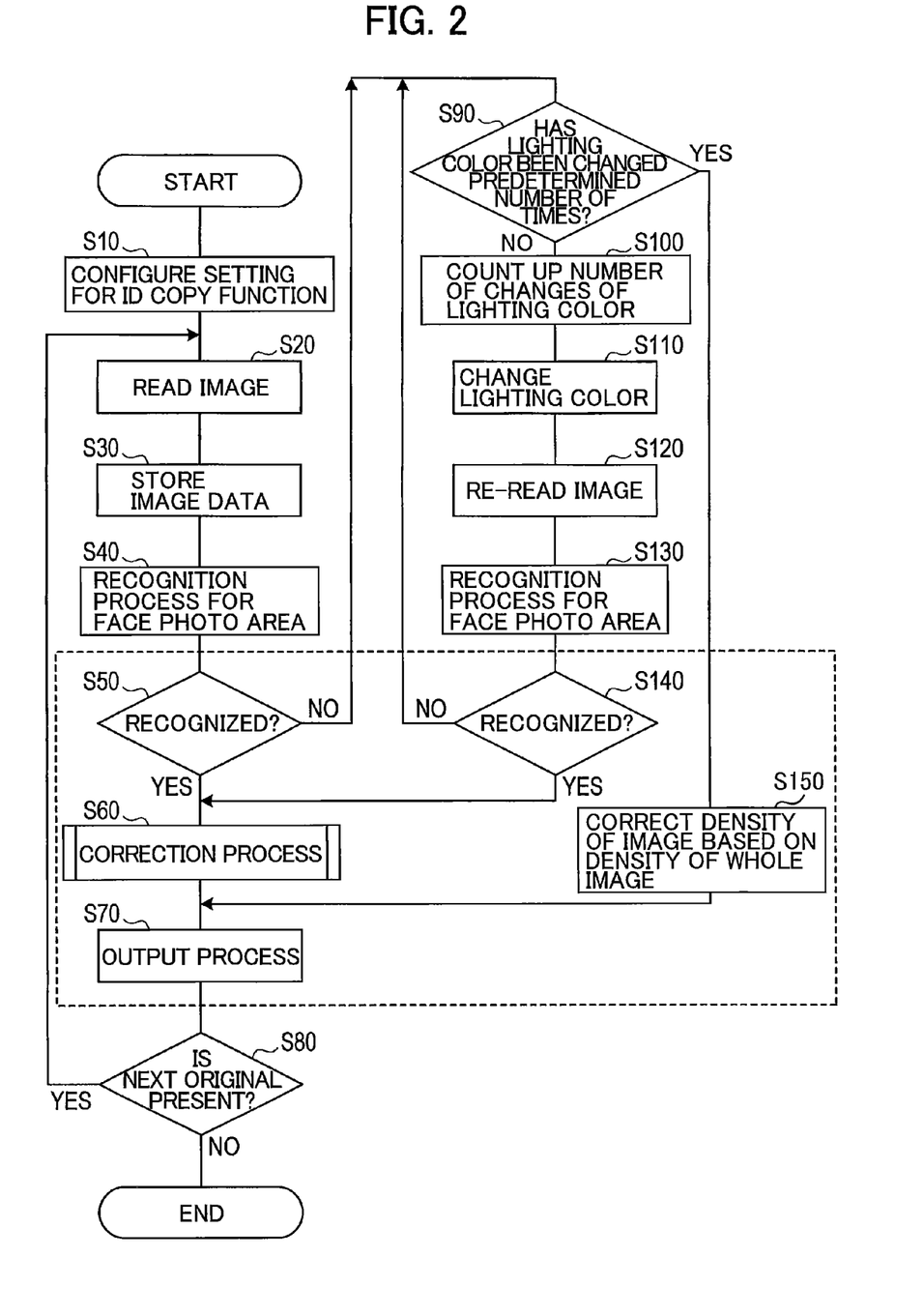
FIG. 2 is a flowchart illustrating steps in an ID copy process executed by the MFP.

At the beginning of the ID copy process, in S10 the MFP 1 first configures settings required for executing a variety of processes associated with the ID copy function. For example, in S10, each unit involved in the ID copy function is initialized; a data buffer is allocated in the RAM 5; and a counter is initialized. The counter is allocated in the RAM 5 for counting the number of changes of the lighting color of the light emitting portion 11A, as described later. In S10, the initial value of the counter is set to zero.

Figure 3:
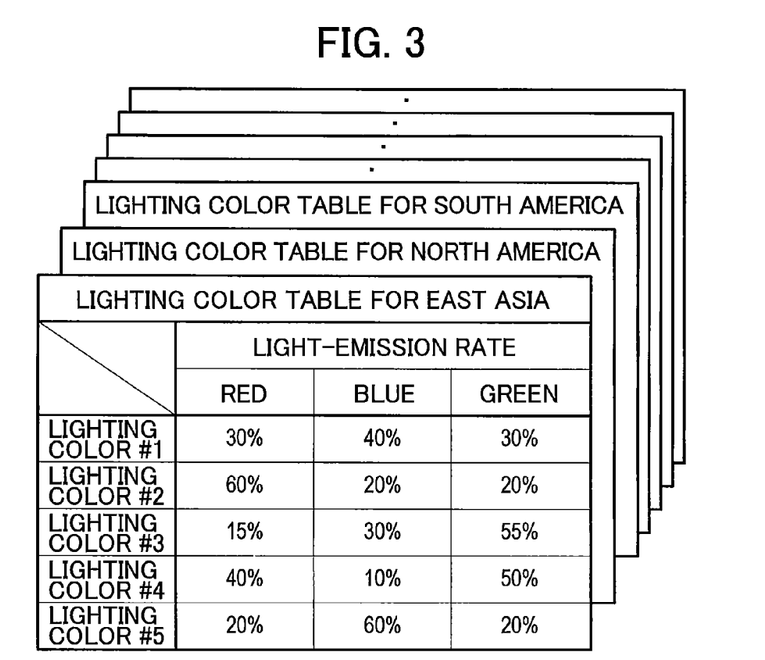
FIG. 3 is an explanatory diagram showing an example of lighting color tables.

The MFP 1 then reads an image of an original in S20. In S20, the image is read by the reading unit 11. In S20, the MFP 1 causes the light emitting portion 11A to emit light with the lighting color in accordance with lighting color tables. In the present embodiment, the ROM 7 stores a plurality of lighting color tables, as illustrated in FIG. 3. Moreover, one lighting color table has five types of lighting color information (i.e. lighting color information #1 through #5). Each of the lighting color tables is associated with a region such as East Asia, North America, South America, and the like. Thus, one lighting color table to be used is selected from among the lighting color tables stored in the ROM 7 according to the setting of MFP 1. The setting of MFP 1 can be arbitrary changed by a user.

In the ID copy process, the five types of lighting color information in one selected lighting color table are sequentially selected one by one from the lighting color information #1. In S20, the MFP 1 selects the lighting color information #1, and the reading unit 11 reads the image of the original while emitting light with the lighting color #1 from the light emitting portion 11A.

The MFP 1 then stores image data in S30. In S30, the image data representing the image which is read by the reading unit 11 in S20 is stored in the RAM 5. There is a potential for correction of the image data in the following processes as described later. In S30, the image data before correction, i.e. uncorrected image data is stored in the RAM 5. Hereinafter, the image data stored in S30 is referred to as a "stored image data" and the image represented by the stored image data is referred to as a "stored image". The stored image data is an example of first image data of the present disclosure.

The MFP 1 then executes a recognition process for the face photo area in S40. In S40, the MFP 1 executes the recognition process on the stored image data stored in the RAM 5 in S30. The MFP 1 determines whether there exists an area having characteristics of a human face in the stored image data, and if exists, the MFP 1 recognizes the area as the face photo area. The determination as to whether there exists an area having characteristics of a human face in the stored image data is made according to some determination conditions. The determination condition is, for example, that characteristic points corresponding to eyebrows, eyes, a nose, and a mouth are located at predetermined relative positions in an area which might contain an image of a human face. Note that various types of face recognition technologies exist and are put to practical use, for example, for digital cameras. Thus, any type of face recognition technologies may be employed. Since such recognition technologies are already known, the detailed description thereof is omitted herein. The recognition process executed in S40 is an example of a first recognition process of the present disclosure.

Figure 4:
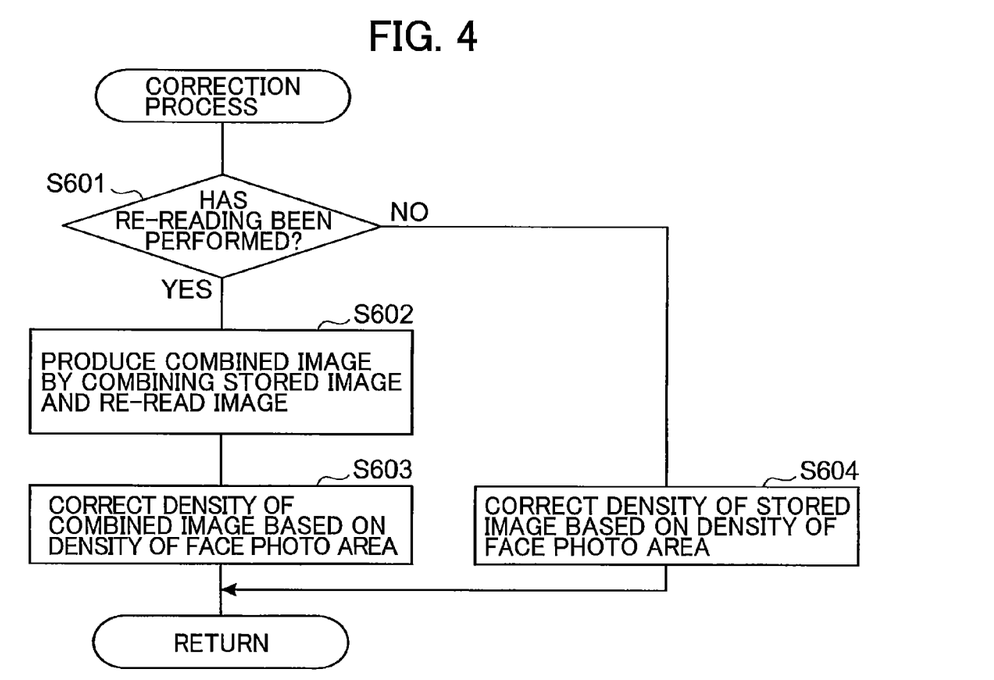
FIG. 4 is a flowchart illustrating steps in a correction process executed in the ID copy process illustrated in FIG. 2.

The MFP 1 then determines whether a face photo area has been recognized in S50. If the face photo area has been recognized (S50: YES), in S60 the MFP 1 corrects density and the like of the image on the basis of density and the like of the recognized face photo area. In S60, the MFP 1 corrects the whole image with respect to factors such as density, a shade level, brightness, contrast, a color tone, and the like on the basis of brightness, a shade level, density, a color tone, and the like of the recognized face photo area. The above factors can affect the visibility of the face photo area. All factors may be used for the correction, but at least one factor only has to be used. For example, only the density may be used for the correction. In the present embodiment, the description will be made in the case where the density is used as the factor and the correction is performed with respect to the density. In addition, any of specific correction methods may be used. For example, a well-known correction method such as a gamma correction may be used to correct the image. In the present embodiment, a correction process illustrated in FIG. 4 is executed in S60 as described later.

In S70, the MFP 1 executes an output process based on the image data which was corrected in S60. In S70, print output or file output is performed in accordance with the setting of the MFP 1. In the case of the print output, an image is formed on a recording medium by the image forming unit 12, and the recording medium is discharged from the MFP 1. In the case of the file output, a file in a Joint Photographic Experts Group (JPEG) format, a Tagged Image File Format (TIFF), a Portable Document Format (PDF), or the like is created in accordance with the setting of the MFP 1. The created file is stored in the auxiliary storage 13 or is further converted to an electronic-mail format to which the created file is attached and sent to a mail server (not shown) via the communication unit 16.

The MFP 1 then determines whether a next original is present in S80. In S80 any method may be employed to determine whether the next original is present. As an example, a message may be displayed on the display unit 15 to inquire of a user whether the next original is present. In this case, when the user performs an input operation on the input unit 14 to indicate the presence of the next original, the MFP 1 may determine that the next original is present. When the next original is not present (S80: NO), the ID copy process illustrated in FIG. 2 is terminated. When the next original is present (S80: YES), the MFP 1 initializes the counter (not shown) and returns to S20. As a result, the steps illustrated in and after S20 are also repeated for the next original.

If the face photo area is not recognized (S50: NO), the MFP 1 determines whether lighting color of the light emitting portion 11A has been changed predetermined number of times (S90). In S90, the MFP 1 makes the determination referring to the counter in the RAM 5.

In the ID copy process, as described above, the five types of lighting color information in one selected lighting color table are sequentially selected one by one from the lighting color information #1. In S90, the MFP 1 determines whether the lighting color has been changed four times (that is, in the present embodiment, the predetermined number of times is four, which corresponds to the number of times in which the lighting color information #5 is used). In other words, in S90, the MFP 1 determines whether all the lighting color information #1 through #5 in the selected lighting color table have been used. However, four or less, or six or more types of lighting color information may be used. In this case, the predetermined number of times, which is a criterion of the determination used in S90, is changed in accordance with the number of types of the lighting color information in one lighting color table.

When the MFP 1 determines that the lighting color has not been changed the predetermined number of times (S90: NO), in S100, the MFP 1 counts the number of changes of the lighting color. In S100, the MFP 1 adds one to the value (initial value is zero) of the counter which is allocated in the RAM 5. The value of the counter is referred when the MFP 1 determines in S90 whether the lighting color has been changed the predetermined number of times, as described above. The MFP 1 then changes the lighting color of the light emitting portion 11A of the reading unit 11 in S110. In S110, light-emission rates of RGB three colors are changed in accordance with the selected lighting color table illustrated in FIG. 3.

At the beginning of the ID copy process, that is, in the reading process of S20, the lighting color of the light emitting portion 11A is set to the lighting color #1 illustrated in FIG. 3. In this case, on and off of the light emitting portion 11A is controlled during the reading unit 11 reads the image such that, assuming that the total time required for reading one line of the image corresponds to 100%, a lighting time of red color is 30%, a lighting time of blue color is 40%, and a lighting time of green color is 30%. When the step S110 is executed for the first time, the lighting color of the light emitting portion 11A is changed from the lighting color #1 to the lighting color #2 illustrated in FIG. 3. In this case, during the reading unit 11 reads the image, on and off of the light emitting portion 11A is controlled such that the lighting time of red color is 60%, the lighting time of blue color is 20%, and the lighting time of green color is 20%. As a result, the lighting color of the light emitting portion 11A is changed from the slightly-bluish lighting color #1 to the reddish lighting color #2. When S110 is re-executed in consequence of the processes described later, the lighting color of the light emitting portion 11A is changed in an order of the lighting color #3, #4, and #5 for each execution of the step S110.

The MFP 1 then re-reads the image in S120. In S120, the MFP 1 causes the light emitting portion 11A to emit light with the lighting color which has been changed in S110, and then the image of the original is read again by the reading unit 11. In the case where an image of an original is read while a light source emits light toward the original, as a color of the image of the original and a color of the light of the light source get closer to a relationship where both colors are complementary to each other, a read image tends to become clearer; as the color of the image of the original and the color of the light of the light source get closer to a relationship where both colors are the same as each other, a read image tends to become unclear. An example of complementary colors is, for example, red and blue-green. If the color of the image of the original is red, then the image can be more clearly read as the color of the light of the light source gets closer to blue-green, whereas the image can be more difficult to read as the color of the light of the light source gets closer to red.

In S120, the reading unit 11 re-reads the image of the original after the lighting color of the light emitting portion 11A was changed in S110. Thus, the image might be clearly read owing to changing the lighting color, even though the image was not clearly read in the previous reading. Image data representing the re-read image which is read by the reading unit 11 in S120 is an example of second image data of the present disclosure.

The lighting color information #1 through #5 stored in each of the lighting color tables is set in consideration of color tones of human faces. Furthermore, the lighting color information #1 through #5 are stored in each of the lighting color tables in an order in which a lighting color with which an image of a human face might be more clearly read is preferentially selected. Moreover, since the distribution of human's skin color differs depending on regions in the world, the lighting color that is preferentially selected also differs depending on the regions. Thus, the plurality of lighting color tables are associated with the regions in the world, as described above. As to the lighting color information stored in each lighting color table, the light-emission rate and the priority of the lighting color are varied for each lighting color table. In this manner, the MFP 1 has the plurality of lighting color tables associated with the regions in the world, and reads an image while changing the lighting color. Therefore, the MFP 1 can clearly read an image of a human face in a relatively early stage.

The MFP 1 then executes a recognition process for the face photo area on the image data representing the re-read image (S130). In S130, the same recognition process as that in S40 is executed. The recognition process executed in S130 is an example of a second recognition process of the present disclosure. The MFP 1 then determines whether the face photo area has been recognized in S140. If the face photo area has been recognized (S140: YES), then the MFP 1 proceeds to S60 which has been described previously. As a result, the density of the image is corrected on the basis of the density of the recognized face photo area in S60. More specifically, in the present embodiment, the correction process illustrated in FIG. 4 is executed in S60.

Hereinafter, the correction process based on the density of the face photo area will be described with reference to FIG. 4. Upon starting the correction process illustrated in FIG. 4, the MFP 1 determines whether the MFP 1 has performed the re-reading in S601. In S601, the MFP 1 determines whether the step S120 has been performed at least once. The MFP 1 determines that the re-reading has been performed, for example, when the value of the counter is equal to or greater than one. When the re-reading has been performed (S601: YES), in S602, the MFP 1 combines an image piece in an area outside the face photo area of the stored image that was stored in S30 with an image piece in the face photo area of the re-read image that was re-read in S120 to produce a combined image. In the case that the step S120 is executed a plurality of number of times, an image which was lastly re-read and in which the face photo area was recognized is used as the re-read image. In S603, the MFP 1 corrects the density of the combined image combined in S602 on the basis of the density of the face photo area in the combined image. The MFP 1 then completes the correction process illustrated in FIG. 4 (that is, S60 illustrated in FIG. 2). When the MFP 1 has never performed the re-reading (S601: NO), in S604, the MFP 1 corrects the density of the stored image stored in S30 on the basis of the density of the face photo area in the stored image. The MFP 1 then completes the correction process illustrated in FIG. 4 (that is, S60 illustrated in FIG. 2).

Returning to FIG. 2, if the face photo area has not been recognized (S140: NO), then the MFP 1 proceeds to S90 as described previously. As a result, the steps illustrated in and after S90 are re-executed when the MFP 1 has not been able to recognize the face photo area. Thus, there is a potential for recognition of the face photo area in the re-executed steps.

In the case where the steps in and after S90 are repeatedly executed, the MFP 1 can determine that the lighting color has been changed the predetermined number of times (S90: YES). In this case, the MFP 1 corrects the density of the stored image data which has not been corrected (S150). To be specific, when the face photo area has not been recognized even with five times of image reading including the first image reading in S20, the density correction is performed on the uncorrected stored image data stored in S30. In S150, since the face photo area has not been recognized, the density correction may be performed on the whole image based on the density of the whole image. When the process of S150 is completed, the MFP 1 then proceeds to S70, and performs the print output or the file output of the image which was corrected in S150.

Advantageous Effects

As described above, according to the MFP 1, when an image of an original is read and a face photo area is not recognized (S50: NO), the steps illustrated in S90 through S140 are executed. As a result, the processes in and after the reading process performed in S20 through S50 are re-executed. When the reading process is re-executed in S120, the execution of the process in S110 allows the light emitting portion 11A to emit light with the lighting color different from that of the reading process before the re-execution. In accordance with the change of the lighting color, a color tone and density of the read image is changed. Consequently, the blocked-up of a dark color portion and the blown out of a light color portion can be reduced to an extent that the face photo area is recognized in a re-executed recognition process even when the face photo area was not recognized in a previously executed recognition process executed before the re-executed recognition process. As a result of the reduction, a more appropriate output result can be obtained regarding an image which is printed out in the output process or is outputted as a file in the same.

According to the MFP 1 described above, when the MFP 1 reads an image of an original and can recognize the face photo area (S50: YES), the correction process on the whole image including the face photo area is executed in S60. The execution of such a correction process allows density of the face photo area to be corrected and thereby makes the face photo area clearer compared with the case where a similar correction process is not executed.

According to the MFP 1 described above, when the MFP 1 executes the steps illustrated in S90 through S140, re-executes the processes performed in and after the reading process, and determines in the re-execution of the determination process that the face photo area has been recognized (S140: YES), the MFP 1 executes the combining process in S602. In the combining process, an image piece in an area outside the face photo area of the read image which has been read in the reading process performed for the first time in S20 (that is, the stored image stored in S30) and an image piece in the face photo area of the re-read image which has been read in the re-executed reading process in S120 are combined to produce a combined image. In S603, the correction is performed on the whole combined image produced in the combining process of S602. As a result, in this case, the image which has been read under a standard reading condition can be used for the image piece in the area outside the face photo area.

According to the MFP 1 described above, the MFP 1 is configured to be capable of switching the lighting color of the light emitting portion 11A into one of n-number of types of lighting colors during executing the reading process (n is an integer equal to or greater than two, and in the above described embodiment, n equals to 5). In the case where the MFP 1 uses all the n-number of types of lighting colors to execute and re-execute the reading process but does not recognize the face photo area even in the last re-execution process, the MFP 1 executes, in the output process, the print output of the image which has been read in the first reading process or the file output of the image data representing the image which has been read in the first reading process. Thus, when the face photo area has not been recognized even with the changes of the lighting color, an output result can be obtained by using an image which has been read under the standard reading condition.

According to the MFP 1 described above, the lighting color is changed by switching the light-emission rates of a plurality of light sources having different colors. Thus, a larger number of lighting colors can be created compared to the number of colors of the light sources themselves. Therefore, light with a color tone suitable for recognizing the face photo area can be emitted at a higher probability. As a result, the recognition rate of the face photo area can be improved.

Other Embodiments

While the description has been made in detail with reference to specific embodiment, it would be apparent to those skilled in the art that various changes and modifications may be made thereto without departing from the spirit and the scope of the above described aspect.

In the above-described embodiment, when a user performs an input operation on the input unit 14 to use the ID copy function, the operation mode of the MFP 1 is switched to the ID copy mode, for example. However, the operation mode may be switched by other methods. To be more specific, the operation mode of the MFP 1 may be switched to the ID copy mode when a user performs an input operation on an external device (such as a personal computer, not shown), instead of the input unit 14, to use the ID copy function. The external device is communicably connected with the MFP 1 via the communication unit 16. Alternatively, the operation mode of the MFP 1 may be switched to the ID copy mode when a sensor (not shown) detects that an original whose size is equal to or smaller than that of a passport or a driving license is set on the reading unit 11.

Figure 5:
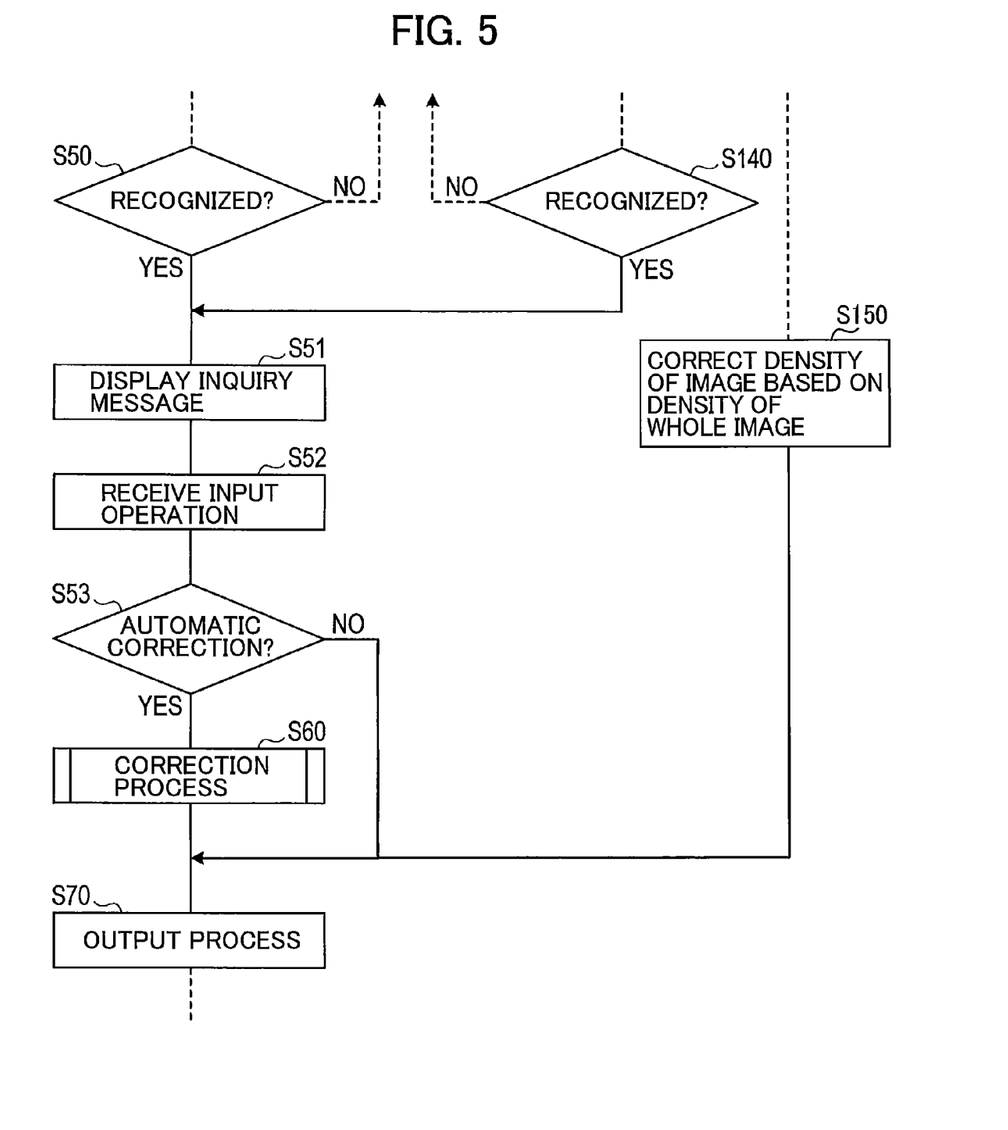
FIG. 5 is a flowchart illustrating steps in an inquiry process to inquire of a user whether to perform an automatic correction, where the inquiry process is executed as substitute for steps surrounded with dashed lines illustrated in FIG. 2.

In the above-described embodiment, when the face photo area is recognized in S50 or S140, the MFP 1 immediately proceeds to S60 to perform the automatic correction of the whole image including the face photo area based on the density of the face photo area. However, the MFP 1 may inquire of a user whether to perform the automatic correction. In this case, as shown in FIG. 5, when the face photo area is recognized (S50: YES or S140: YES), the MFP 1 displays, on the display unit 15, a message to inquire of a user whether to perform the automatic correction in S51. In S51, the MFP 1 displays the image which was lastly read at that time on the display unit 15 in addition to the message. The display of the image performed in this manner facilitates the user to more easily judge the necessity of the automatic correction.

After S51, the MFP 1 allows an input operation on the input unit 14 to be received in S52. When the user performs an input operation on the input unit 14 to perform the automatic correction (S53: YES), the MFP 1 proceeds to S60. In contrast, when the user performs an input operation on the input unit 14 not to perform the automatic correction (S53: NO), the MFP 1 proceeds to S70 without executing the step S60. Alternatively, the MFP 1 may proceed to S150 to correct density of the image only based on the density of the whole image, and then may proceed to S70. Further, the MFP 1 may execute the steps illustrated in S51 through S53 prior to the execution of S40, and may perform the steps in and after S40 only when the user performs the input operation to perform the automatic correction (S53: YES).

Figure 6:
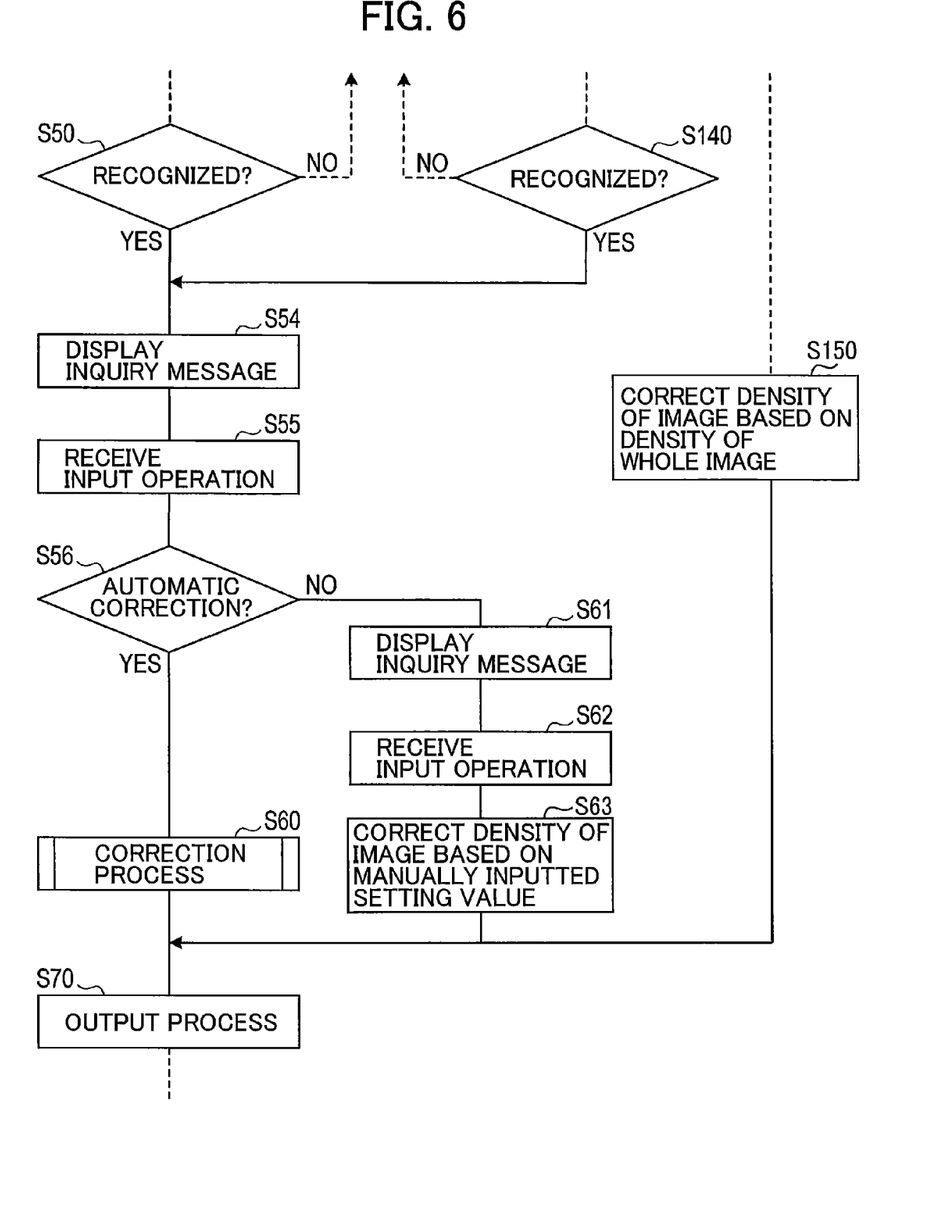
FIG. 6 is a flowchart illustrating steps in a selection process to allow a user to select one of an automatic correction and a manual correction, where the selection process is executed as substitute for the steps surrounded with the dashed lines illustrated in FIG. 2.

Alternatively, when the face photo area is recognized in S50 or S140, the MFP 1 may allow a user to select the automatic correction of S60 or a manual correction performed by the user. In this case, as illustrated in FIG. 6, when the face photo area is recognized (S50: YES or S140: YES), the MFP 1 displays, on the display unit 15, a message to inquire of a user whether to perform the automatic correction or the manual correction performed by the user in S54. In S54, the MFP 1 displays the image which was lastly read at that time on the display unit 15 in addition to the message. The display of the image performed in this manner facilitates the user to more easily judge whether the automatic correction is suitable for the correction or the manual correction is suitable for the correction.

After S54, the MFP 1 allows an input operation on the input unit 14 to be received in S55. When the user performs an input operation on the input unit 14 to perform the automatic correction (S56: YES), the MFP 1 proceeds to S60. In contrast, when the user performs an input operation on the input unit 14 to perform the manual correction (S56: NO), the MFP 1 displays, on the display unit 15, an input screen used to change a setting value of a correction factor, and allows an input operation on the input unit 14 to be received in S62. When the user completes the input operation on the input unit 14 to change the setting value, in S63 the MFP 1 performs the correction based on the manually inputted setting value, and proceeds to S70.

In the above-described embodiment, in S80, when a user performs an input operation on the input unit 14 to indicate the presence of a next original, the MFP 1 determines the presence of the next original. However, other methods of the determination may be used. For example, when a sensor (not shown) detects a remaining original which has been set on an automatic document feeder (ADF) of the reading unit 11, the MFP 1 may determine the presence of the next original.

In the above-described embodiment, in S603, the MFP 1 corrects density of the compound image which is combined in S602 on the basis of density of the face photo area. However, the present disclosure is not limited to this. For example, when proceeding from S140 to S60, the MFP 1 may correct the image in S60 by using the whole re-read image which has been read in S120 with no change. Further, the procedure of the correction and the combining may be reversed. To be specific, taking the re-read image which has been read in S120 as a target image of the correction in S60, density of the face photo area in the target image is corrected; an image of the corrected face photo area is combined with an image piece in an area outside the face photo area of the stored image stored in S30 to produce a combined image; and the combined image is then outputted in S70. The difference in the procedure may cause slight difference in the area outside the face photo area. On the face photo area, however, the correction can be performed in consideration of color tones of human faces in either procedure, and thus facial characteristics can be made clear.

Figure 7:
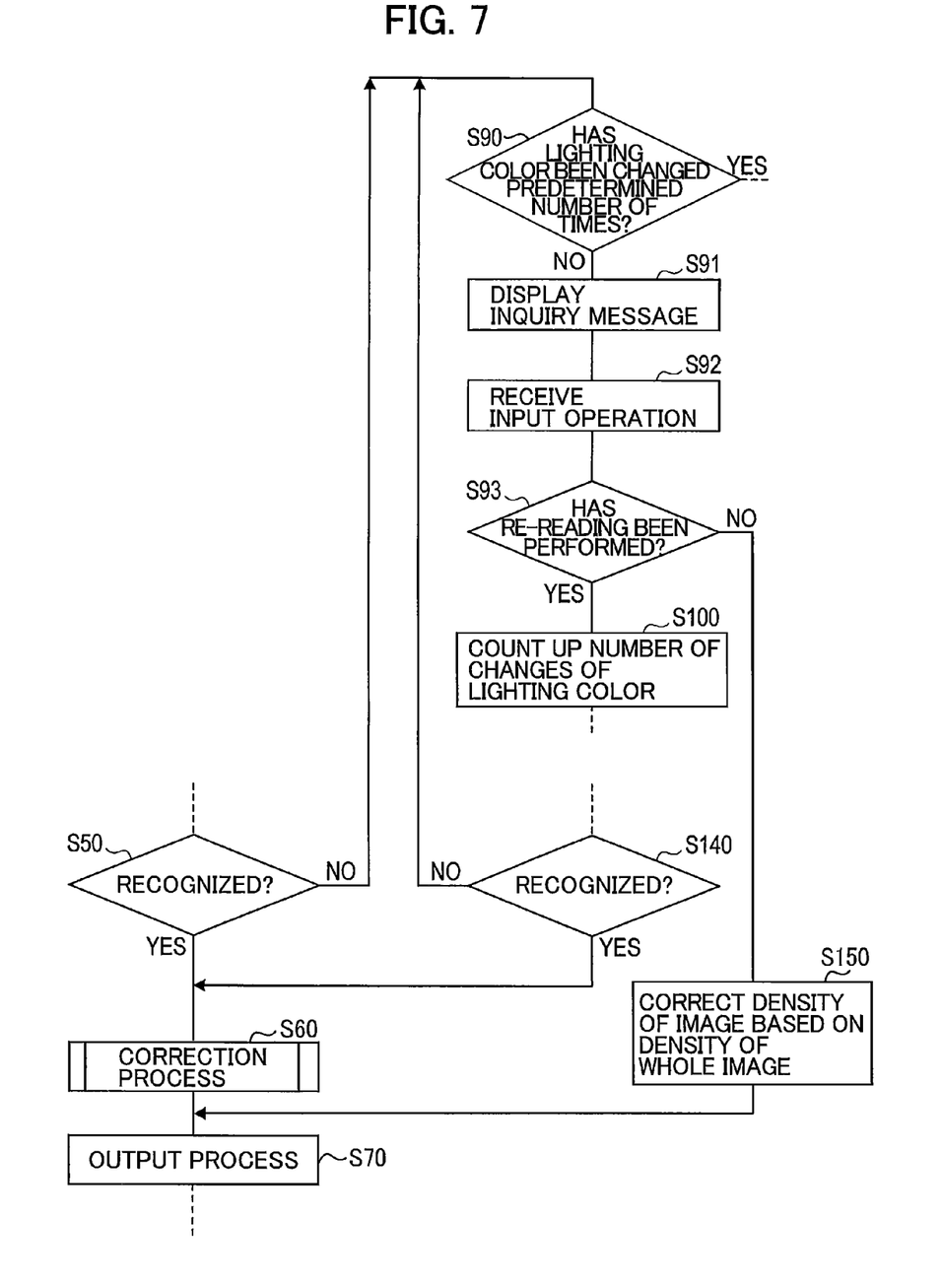
FIG. 7 is a flowchart illustrating steps in an inquiry process to inquire of a user whether to perform re-reading an image, where the inquiry process is executed as substitute for the steps surrounded with the dashed lines illustrated in FIG. 2.

In the above-described embodiment, when the MFP 1 determines in S90 that the lighting color has not been changed the predetermined number of times, the MFP 1 immediately proceeds to S100. However, before proceeding to S100, the MFP 1 may inquire of a user whether to re-read the image. For example, as illustrated in FIG. 7, when the MFP 1 determines that the lighting color has not been changed the predetermined times (S90: NO), the MFP 1 displays on the display unit 15 a message of a user to inquire whether to re-read the image in S91. In S91, the MFP 1 displays the image which was lastly read at that time on the display unit 15 in addition to the message. The display of the image performed in this manner facilitates the user to more easily judge the necessity of the re-reading.

After S91, the MFP 1 allows an input operation on the input unit 14 to be received in S92. When the user performs an input operation on the input unit 14 to perform the re-reading (S93: YES), the MFP 1 proceeds to S100. In contrast, when the user performs an input operation on the input unit 14 not to perform the re-reading (S93: NO), the MFP 1 may proceed to S150. Alternatively, when the user performs the input operation on the input unit 14 not to perform the re-reading (S93: NO) as described above, the MFP 1 may allow the user to select the automatic correction of S150 or a manual correction performed by the user previously illustrated in steps S61 through S63 of FIG. 6.

Thus, the MFP 1 may inquire of a user whether to re-execute the processes performed in and after the reading process, and may re-execute the processes performed in and after the reading process only when an instruction for the re-execution is inputted. In this case, since the MFP 1 can re-execute the reading of the original as needed depending on the user's determination, usability of the MFP 1 is improved. The MFP 1 may execute the output process when an instruction not to re-execute the processes performed in and after the reading process is inputted. In this case, since the MFP 1 can execute the output process as needed depending on the user's determination, the user can quickly obtain an output result when the re-execution of the processes, performed in and after the reading process, is not necessary.

Furthermore, in the above-described embodiment, a predetermined function achieved by one component may be achieved by a plurality of components cooperating with each other. Alternatively, in the above-described embodiment, a plurality of functions of a plurality of components, and a predetermined function achieved by a plurality of components cooperating with each other, may be achieved by a single component. Part of a structure of the above-described embodiments may be omitted. At least one part of a structure of one of the above-described embodiments may be added to a structure of another embodiment of the above-described embodiments, or may be replaced with a portion of a structure of another embodiment of the above-described embodiments. In addition to the above-described image processing device, the present disclosure may be implemented in a variety of embodiments including a system which uses the image processing device as a component.

[Supplement]

As can be seen from the above-described exemplary embodiments, the image processing device of the present disclosure may further include the following configurations.

Preferably, the set of computer-readable instructions, when executed by the processor, causes the image processing device to further perform: in response to determining that the ID photograph is recognized in the first recognition process, correcting at least the ID photograph. In this case, the outputting may output the image after the correction.

With this configuration, a correction process is executed to an ID photograph when an image of an original is read and the ID photograph is recognized. This correction process is executed with respect to factors such as density, brightness, contrast, a color tone, and the like. These factors can affect the visibility of the ID photograph. The execution of such a correction process allows the ID photograph to be corrected and thereby makes the ID photograph clearer compared with the case where a similar correction process is not executed.

Preferably, the set of computer-readable instructions, when executed by the processor, causes the image processing device to further perform: executing a second recognition process on the second image data, the second recognition process being executed for recognizing the ID photograph in the image represented by the second image data; determining whether the ID photograph is recognized in the second recognition process; and in response to determining that the ID photograph is recognized in the second recognition process, outputting the image based on the second image data.

Preferably, the set of computer-readable instructions, when executed by the processor, causes the image processing device to further perform: in response to determining that the ID photograph is recognized in the second recognition process, combining the ID photograph with an image piece in an area outside the ID photograph of the image represented by the first image data to produce a combined image. In this case, the outputting may output the combined image.

With this configuration, an image piece which is read under a standard reading condition can be used for an area outside the ID photograph.

Preferably, the set of computer-readable instructions, when executed by the processor, causes the image processing device to further perform: correcting the combined image based on the ID photograph. In this case, the outputting may output the combined image after the correction.

Preferably, the image processing device further includes: a display; and an operation interface. The set of computer-readable instructions, when executed by the processor, causes the image processing device to further perform: in response to determining that the ID photograph is not recognized in the first recognition process, displaying the image represented by the first image data on the display and inquiring whether to re-read the image of the original; and receiving one of a first instruction and a second instruction via the operation interface, the first instruction instructing to re-read the image of the original, the second instruction instructing not to re-read the image of the original. In this case, the reading the image of the original while the light emitting portion emits light with the second lighting color may be executed in response to receiving the first instruction.

With this configuration, reading of an original can be re-executed as needed depending on the user's determination. Thus, usability of the image processing device is improved.

Preferably, the outputting the image represented by the first image data is executed in response to receiving the second instruction.

With this configuration, an output process can be executed as needed depending on the user's determination. Thus, the user can quickly obtain an output result when re-execution of processes, performed in and after a reading process, is not necessary.

Preferably, the light emitting portion is configured to emit light with one of n-number of types of lighting colors, where n is an integer equal to or greater than two. The set of computer-readable instructions, when executed by the processor, causes the image processing device to further perform: in response to determining that the ID photograph is not recognized in the first recognition process, selecting unselected one of the n-number of types of lighting colors as the second lighting color; and when all the n-number of types of lighting colors are selected in the selecting, outputting the image represented by the first image data.

With this configuration, in the case where an ID photograph is not recognized even when the lighting color is changed, an output result can be obtained by using an image which has been read under a standard reading condition.

Preferably, the light emitting portion includes a plurality of light sources classified into prescribed groups on a color basis. In this case, the switching may switch the lighting colors of the light emitting portion by changing a rate of light emission of the light sources belonging to each of the prescribed groups.

With this configuration, a larger number of lighting colors can be produced compared to the number of colors of light sources themselves. Thus, light with a color tone suitable to recognize an ID photograph can be emitted at a higher probability. This can improve the recognition rate of the ID photograph.

Each process performed by the processor of the components which may be included in the above-described image processing device of the present disclosure may be executed by a program for the image processing device of the present disclosure causing a computer of the processor of the image processing device to execute the process.

What is claimed is:

1. An image processing device comprising:
   a reader comprising:
      a light emitting portion configured to emit light toward an original forming an image; and
      a light receiving portion configured to receive light reflected from the original;
   a processor; and
   a memory storing a set of computer-readable instructions therein, the set of computer-readable instructions, when executed by the processor, causing the image processing device to perform:
      reading the image of the original while the light emitting portion emits light with a first lighting color to acquire first image data representing the image;
      storing the first image data in the memory;
      executing a first recognition process on the first image data, the first recognition process being executed for recognizing an ID photograph in the image represented by the first image data;
      determining whether the ID photograph is recognized in the first recognition process; and
      either outputting the image represented by the first image data in response to determining that the ID photograph is recognized in the first recognition process, or switching a lighting color of the light emitting portion from the first lighting color to a second lighting color different from the first lighting color and reading the image of the original while the light emitting portion emits light with the second lighting color to acquire second image data representing the image in response to determining that the ID photograph is not recognized in the first recognition process.

2. The image processing device according to claim 1, wherein the set of computer-readable instructions, when executed by the processor, causes the image processing device to operate in selected one of a plurality of modes including an ID copy mode for executing the first recognition process.

3. The image processing device according to claim 1, wherein the set of computer-readable instructions, when executed by the processor, causes the image processing device to further perform:
   in response to determining that the ID photograph is recognized in the first recognition process, correcting at least the ID photograph; and
   wherein the outputting outputs an image including the ID photograph after the correction.

4. The image processing device according to claim 1, wherein the set of computer-readable instructions, when executed by the processor, causes the image processing device to further perform:
   executing a second recognition process on the second image data, the second recognition process being executed for recognizing the ID photograph in the image represented by the second image data;

determining whether the ID photograph is recognized in the second recognition process; and in response to determining that the ID photograph is recognized in the second recognition process, outputting the image based on the second image data.

5. The image processing device according to claim 4, wherein the set of computer-readable instructions, when executed by the processor, causes the image processing device to further perform:

in response to determining that the ID photograph is recognized in the second recognition process, combining the ID photograph with an image piece in an area outside the ID photograph of the image represented by the first image data to produce a combined image; and wherein the outputting outputs the combined image.

6. The image processing device according to claim 5, wherein the set of computer-readable instructions, when executed by the processor, causes the image processing device to further perform:

correcting the combined image based on the ID photograph; and wherein the outputting outputs the combined image after the correction.

7. The image processing device according to claim 1, further comprising:

a display; and an operation interface;

wherein the set of computer-readable instructions, when executed by the processor, causes the image processing device to further perform:

in response to determining that the ID photograph is not recognized in the first recognition process, displaying the image represented by the first image data on the display and inquiring whether to re-read the image of the original; and receiving one of a first instruction and a second instruction via the operation interface, the first instruction instructing to re-read the image of the original, the second instruction instructing not to re-read the image of the original;

wherein the reading the image of the original while the light emitting portion emits light with the second lighting color is executed in response to receiving the first instruction.

8. The image processing device according to claim 6, wherein the outputting the image represented by the first image data is executed in response to receiving the second instruction.

9. The image processing device according to claim 1, wherein the light emitting portion is configured to emit light with one of n-number of types of lighting colors, where n is an integer equal to or greater than two;

wherein the set of computer-readable instructions, when executed by the processor, causes the image processing device to further perform:

in response to determining that the ID photograph is not recognized in the first recognition process, selecting unselected one of the n-number of types of lighting colors as the second lighting color; and when all the n-number of types of lighting colors are selected in the selecting, outputting the image represented by the first image data.

10. The image processing device according to claim 1, wherein the light emitting portion includes a plurality of light sources classified into prescribed groups on a color basis; and wherein the switching switches the lighting colors of the light emitting portion by changing a rate of light emission of the light sources belonging to each of the prescribed groups.

11. A non-transitory computer readable storage medium storing a set of program instructions for an image processing device, the image processing device comprising:

a reader comprising:

a light emitting portion configured to emit light toward an original forming an image; and a light receiving portion configured to receive light reflected from the original;

a processor; and a memory, the set of program instructions, when executed by the processor, causing the image processing device to perform:

reading the image of the original while the light emitting portion emits light with a first lighting color to acquire first image data representing the image;

storing the first image data in the memory;

executing a first recognition process on the first image data, the first recognition process being executed for recognizing an ID photograph in the image represented by the first image data;

determining whether the ID photograph is recognized in the first recognition process; and either outputting the image represented by the first image data in response to determining that the ID photograph is recognized in the first recognition process, or switching a lighting color of the light emitting portion from the first lighting color to a second lighting color different from the first lighting color and reading the image of the original while the light emitting portion emits light with the second lighting color to acquire second image data representing the image in response to determining that the ID photograph is not recognized in the first recognition process.

12. An image processing device comprising:

a reader comprising:

a light emitter that emits light toward an original forming an image; and a light receiver that receives light reflected from the original;

a processor; and a memory storing a set of computer-readable instructions therein, the set of computer-readable instructions, when executed by the processor, causing the image processing device to perform:

reading the image of the original while the light emitting portion emits light with a first lighting color to acquire first image data representing the image;

storing the first image data in the memory;

executing a first recognition process on the first image data, the first recognition process being executed for recognizing an ID photograph in the image represented by the first image data;

determining whether the ID photograph is recognized in the first recognition process; and either outputting the image represented by the first image data in response to determining that the ID photograph is recognized in the first recognition process, or switching a lighting color of the light emitting portion from the first lighting color to a second lighting color different from the first lighting color and reading the image of the original while the light emitting portion emits light with the second lighting color to acquire second image data representing the image in response to determining that the ID photograph is not recognized in the first recognition process.

\* \* \* \* \*